(12) United States Patent
Adam

(10) Patent No.: US 9,039,803 B2
(45) Date of Patent: May 26, 2015

(54) LIGNIN-BASED MULTIPURPOSE FERTILIZERS

(75) Inventor: Georgius Abidal Adam, Edensor Park (AU)

(73) Assignee: Empire Technology Development LLC, Wilmington, DE (US)

( * ) Notice: Subject to any disclaimer, the term of this patent is extended or adjusted under 35 U.S.C. 154(b) by 89 days.

(21) Appl. No.: 13/699,193

(22) PCT Filed: Mar. 7, 2012

(86) PCT No.: PCT/US2012/028012
§ 371 (c)(1),
(2), (4) Date: Nov. 20, 2012

(87) PCT Pub. No.: WO2013/133919
PCT Pub. Date: Sep. 12, 2013

(65) Prior Publication Data
US 2013/0233037 A1 Sep. 12, 2013

(51) Int. Cl.
C05F 11/00 (2006.01)
C01C 1/18 (2006.01)
C05C 9/00 (2006.01)
C05G 3/06 (2006.01)

(52) U.S. Cl.
CPC .. *C05C 9/005* (2013.01); *C05G 3/06* (2013.01)

(58) Field of Classification Search
CPC .................................. C05C 9/005; C05G 3/06
USPC ............................................ 71/11–30, 54–60
See application file for complete search history.

(56) References Cited

U.S. PATENT DOCUMENTS

| | | | |
|---|---|---|---|
| 2,663,628 A | 12/1953 | Thomsen | |
| 2,714,553 A | 8/1955 | Bibb et al. | |
| 3,137,564 A | 6/1964 | Marx et al. | |
| 3,270,001 A | 8/1966 | Morimoto et al. | |
| 5,075,402 A * | 12/1991 | Schmitt et al. | 527/400 |
| 5,443,613 A | 8/1995 | Robinson | |
| 5,501,720 A | 3/1996 | Buchholz | |
| 5,720,792 A | 2/1998 | Fischer et al. | |
| 6,936,681 B1 | 8/2005 | Wertz et al. | |
| 6,960,617 B2 | 11/2005 | Omidian et al. | |
| 2010/0139159 A1 | 6/2010 | Plate | |
| 2011/0003936 A1 | 1/2011 | Chen et al. | |
| 2013/0233037 A1* | 9/2013 | Adam | 71/23 |

OTHER PUBLICATIONS

International Search Report and Written Opinion for PCT/US2012/028022 dated May 15, 2012.
Adam et al., Thermosetting characteristics of some new polymethylol epoxy resins, *Thermochimica Acta* (Jan. 1, 1987), 109(2):297-301 (Abstract).
Albertsson et al., Design of Renewable Hydrogel Release Systems from Fiberboard Mill Wastewater, *Biomacromolecules* (Apr. 23, 2010), 11(5):1406-1411 (Abstract).
Brooker, Comprehensive, modern text featuring an evolutionary focus with an emphasis on scientific inquiry, *Biology by Robert Brooker, Student Edition*, McGraw-Hill Companies, Incorporated (Jan. 22, 2008), 1386 pp. (Abstract).
Busch et al., Use of renewable resources in the industrial fabric production, *Chemical Engineering & Technology* (Mar. 1, 2006), 78(3): 219-228 (Abstract).
Chen et al., A Brief History of Lignin-Containing Polymeric Materials Culminating in X-ray Powder Diffraction Analyses of Kraft Lignin-Based Thermoplastic Polymer Blends, *ACS Symposium Series* (Apr. 16, 2007), 15(954):229-246 (Abstract).
El-Zawawy, Preparation of hydrogel from green polymer, *Polymers for Advanced Technologies*, (Nov. 12, 2004); 16(1):48-54 (Abstract).
Fengel et al., Wood: Chemistry, Ultrastructure, Reactions, Walter De Gruyter Inc. Publishing (Jun. 1989).
Garcia, et al., Use of Kraft Pine Lignin in Controlled-Release Fertilizer Formulations, *Ind. & Eng. Chem. Res.* (Jan. 8, 1996), 35(1):245-249 (Abstract).
Gellerstedt et al., Towards a new concept of lignin condensation in kraft pulping: Initial results, *Comptes Rendus Biologies* (Sep.-Oct. 2004), 327(9-10):817-826 (Abstract).
Garnjanagoonchorn et al., Determination of chondroitin sulfate from different sources of cartilage, *Chemical Engineering and Processing: Process Intensification* (May 2007), 46(5):465-471 (Abstract).
Heitner et al., Lignin and Lignans: Advances in Chemistry, Edition 1 (Jun. 14, 2010) (Abstract).
Herrmann et al., The Shikimate Pathway, *Annual Review of Plant Physiology and Plant Molecular Biology* (Jun. 1999), 50:473-503 (Abstract).
Malutan et al., Contribution to the Study of Hydroxymetylation Reaction of Alkali Lignin, *BioResources* (2008), 3(1):13-20.
Peng et al., Synthesis and Properties of Lignin-Based Polyurethane Hydrogels, *International Journal of Polymeric Materials* (2011), 60:674-683.
Priefert et al., Biotechnological production of vanillin, *Applied Microbiology and Biotechnology* (2001), 56(3-4):296-314 (Abstract).
Ramirez et al., Ammoxidized kraft lignin as a slow-release fertilizer tested on Sorghum vulgare, *Bioresource Technology* (Jul. 1997), 61(1):43-46 (Abstract).
Sjostrom, Wood Chemistry, $2^{nd}$ Edition, Fundamentals and Applications (Jan. 6, 1993), p. 293 (Abstract).
Turunen et al., Modification of phenol-formaldehyde resol resins by lignin, starch, and urea, *Journal of Applied Polymer Science* (Feb. 5, 2003), 88(2):582-588 (Abstract).
Trenkel, Improving Fertilizer, Use Efficiency: Controlled-Release and Stabilized Fertilizers in Agriculture, International Fertilizer Indistry Associate, Paris (Dec. 1997), pp. 1-151.
Wongsiriwan et al., Lignocellulosic Biomass Conversion by Sequential Combination of Organic Acid and Base Treatments, *Energy Fuels* (Apr. 26, 2010), 24(5):3232-3238 (Abstract).
Adam, Chemistry and Technology of Methylolic Resins: Their Derivatives and IPNs, *National Journal of Chemistry*, (2001), 1:131-157.
Feldman, Lignin and Its Polyblends—A Review, Chemical Modification, Properties, and Usage of Lignin, eds., Thomas Q. Hu, pp. 81-89 (2002).
Khalaf, Calorimetric Investigation of Curing of Some New Polyhydroxy Epoxy Resins, *Thermochemica Acta*, (1987), 111:115-120, Elsevier Science Publishers B.V.

* cited by examiner

*Primary Examiner* — Jennifer A Smith
(74) *Attorney, Agent, or Firm* — Pepper Hamilton LLP

(57) ABSTRACT

Methods for converting waste streams from the wood pulping industry to high-value fertilizers are described. For example, isolated lignin and lignosulphonate or waste streams containing lignin and lignosulphonate can be converted to methylol derivatives and treated with further reagents to produce controlled release fertilizers, hydrogel fertilizers, and soil stabilizers.

21 Claims, No Drawings

LIGNIN-BASED MULTIPURPOSE FERTILIZERS

CLAIM OF PRIORITY

This application is a national phase application under 35 U.S.C. §371 of International Application No. PCT/US2012/028012, filed Mar. 7, 2012 entitled "LIGNIN-BASED MULTIPURPOSE FERTILIZERS", the disclosure of which is incorporated herein by reference in its entirety.

BACKGROUND

Lignin, which represents 15-35% of wood, is the most abundant renewable organic material on the earth. The pulping industry separates cellulose from the wood composition resulting in lignin and hemicellulose waste by-products known as black liquor and spent pulp liquor. In the sulphite process, the main by-product contained in the spent pulp liquor is lignosulphonate. With each ton of pulping products producing 330-540 Kg of lignosulphonate, the global annual production capacity of lignosulphonate is about 1.8-2.0 million tons. Most of the lignosulphonate (66%) produced in pulping industries is burned as fuel and 34% is treated and disposed. Using this waste stream as a fuel source is inefficient, and releases large amounts of pollutants such as $SO_2$. Simple disposing of lignin, on the other hand, incurs a significant cost to the pulping industry.

Water sources for human and agricultural uses are struggling to meet the growing demand due to the increase in human population. Therefore there is a strong international trend to minimize the requirements of irrigation and water supply to agriculture by developing new types of economical, sustainable, naturally derived controlled release hydrogel fertilizers. Progress in this field will have remarkable impact on the agricultural food production efficiency, as well as environmental and economic benefits.

SUMMARY

This disclosure is not limited to the particular systems, devices and methods described, as these may vary. The terminology used in the description is for the purpose of describing the particular versions or embodiments only, and is not intended to limit the scope. While various compositions and methods are described in terms of "comprising" various components or steps (interpreted as meaning "including, but not limited to"), the compositions and methods can also "consist essentially of" or "consist of" the various components and steps, and such terminology should be interpreted as defining essentially closed-member groups.

Methods describe novel and simple processes comprising, among other things, the production of lignin-based multipurpose fertilizers. The methods described herein may allow facile production of high-value products from waste stream from the pulping industry.

In an embodiment, a method of preparing a lignosulphonate methylol may comprise contacting lignosulphonate with an aldehyde compound to produce the lignosulphonate methylol. In such embodiments, the source of the lignosulphonate may be sulphonated black liquor or spent pulp liquor.

In an embodiment, a method of preparing a lignin methylol may comprise contacting lignin with an aldehyde compound at a pH of about 9 to about 10 to produce the lignin methylol. In such embodiments, the source of the lignin may be black liquor.

In an embodiment, a method of preparing lignin methylol or lignosulphonate methylol from solid lignin or solid lignosulphonate may comprise contacting lignin or lignosulphonate with an aldehyde compound to produce lignin methylol or lignosulphonate methylol. In such embodiments, the source of the lignosulphonate may be dried or dewatered black liquor or spent pulp liquor.

In an embodiment, a method of preparing a surfactant may comprise contacting lignin methylol or lignosulphonate methylol with a reagent to produce the surfactant. In some embodiments, the reagent may comprise a carboxylic acid compound and the surfactant may be a lignin carboxylate compound or a lignosulphonate carboxylate compound.

In an embodiment, a method of preparing a surfactant may comprise contacting lignin with a reagent to produce the surfactant. In some embodiments, the reagent may comprise a carboxylic acid compound and the surfactant may be a lignin carboxylate compound or a lignosulphonate carboxylate compound.

In an embodiment, a method of preparing lignocarboxylate or lignosulphonate carboxylate may comprise contacting lignin or lignosulphonate with carbon dioxide to produce lignocarboxylate or lignosulphonate carboxylate.

In an embodiment, a surfactant may comprise a ligno phosphate compound, a lignosulphonate phosphate compound, a ligno ethanolamine compound, a ligno sulphonate ethanolamine compound, a ligno polyhydroxycarboxylate compound, a ligno sulphonate polyhydroxycarboxylate compound, a lignopolycarboxylate compound, a lignosulphonate polycarboxylate compound, a lignopolyhydroxycarboxylate compound, or a lignosulphonate polyhydroxycarboxylate compound.

In some embodiments, a water-based resin may comprise a lignoepoxide compound or a lignosulphonate epoxide compound. In other embodiments, a polyurethane product may comprise a lignourethane compound or a lignosulphonate urethane compound. In further embodiments, a corrosion inhibitor, epoxy hardener, or a base for a hydrogel may comprise a lignoamine compound or a lignosulphonate amine compound.

In an embodiment, a method of preparing a surfactant may comprise contacting a lignin-based material with a carbohydrate or carbohydrate derivative in the presence of a catalyst to produce the surfactant. In some embodiments, the carbohydrate may be dextrose syrup, glucose syrup, or sucrose syrup. In other embodiments, the carbohydrate derivative may be a polyhydroxy carboxylic acid, a hydroxyl polycarboxylic acid, an aminocarboxylic acid, a lithium, sodium, potassium, ammonium or calcium salt thereof or other natural carboxylic acid or salt thereof derived by oxidation or fermentation of a carbohydrate.

In an embodiment, a method of preparing a lignin-based surfactant may comprise contacting a lignin-based material with an amino acid in a solvent to produce the surfactant. In some embodiments, the amino acid is the sodium salt of arginine, leucine, lysine, glycine, glutamic acid, aspartic acid, contrition sulfate, or a combination thereof.

In an embodiment, a method of preparing a Gemini lignin-based surfactant may comprise contacting a lignin-based material with an amino acid in a solvent to produce the Gemini surfactant, wherein the number of reacted methylol groups with the amino acid may be two or more. In some embodiments, the amino acid may be the sodium salt of arginine, leucine, lysine, glycine, glutamic acid, aspartic acid, contrition sulfate, or a combination thereof. In an embodiment, a method of preparing a Gemini surfactant may comprise contacting a lignin-based material with an ethylene diamine derivative reactant to produce the Gemini surfactant, wherein the number of reacted methylol groups with the ethylene diamine derivative may be two or more. In some embodiments, the ethylene diamine derivative reactant may be ethylene diamine, diethylenetriamine, triethylenetetramine, or tetraethylenepentamine or polyethylenediamine.

In an embodiment, a method of preparing a lignin-based surfactant may comprise contacting a lignin-based material with polyethylene oxide terminated with epoxide groups in the presence of a catalyst to produce the surfactant, wherein the number of reacted methylol groups with the ethylene diamine derivative may be two or more. In some embodiments, the polyethylene oxide terminated with epoxide groups has a molecular weight of about Mn=200 to about 600.

In an embodiment, a method of preparing a lignin-based surfactant may comprise contacting a lignin-based material with a silicon compound to produce the surfactant. In some embodiments, the silicon compound may be silicon oil terminated with active siloxane groups.

In an embodiment, a lignin-based surfactant may comprise a lignoamino acid salt compound, a lignosulphonate amino acid salt compound, a lignosilicone compound, a lignosulphonate silicone compound, a ligno-functionalized polymer compound, a lignosulphonate-functionalized polymer compound, a lignosaccharide compound, a lignosulphonate saccharide compound, a lignoethylendiamine derivative compound, a lignosulphonate ethylendiamine derivative compound, a lignoethanolamine derivative compound, lignosulphonate ethanolamine derivative compounds, a lignoglycoside, a lignosulphonate glycoside, or a combination thereof.

In an embodiment, a method of preparing a controlled release fertilizer comprises contacting a lignin-based material with at least one reagent comprising a methylol of a nitrogen-based compound to produce a mixture comprising the controlled release fertilizer. In some embodiments, the at least one reagent may further comprise at least one crosslinking agent. In some embodiments, an amount of lignin-based surfactant may be added to the mixture comprising the controlled release fertilizer.

In an embodiment, a method of preparing a hydrogel controlled release fertilizer comprises contacting a lignin-based material with at least one reagent to produce a mixture comprising the hydrogel controlled release fertilizer, wherein the at least one reagent may comprise a methylol of a nitrogen-based compound, a crosslinking agent, a hydrogel forming material, or a combination thereof. In some embodiments, an amount of lignin-based surfactant may be added to the mixture comprising the hydrogel controlled release fertilizer.

In some embodiments, a fertilizer may comprise a lignourea adduct, a lignosulphonate urea adduct, a lignopolyurea adduct, a lignosulphonate polyurea adduct, a lignobiuret adduct, lignosulphonate biuret adduct, a lignopolyureaformaldehyde adduct, a lignosulphonate polyureaformaldehyde adduct, a lignoaminoacid adduct, a lignosulphonate aminoacid adduct, a lignochondroitin sulphate adduct, a lignosulphonate chondroitin sulphate adduct, a lignopolyureapolyacrylate adduct, a lignosulphonate polyureapolyacrylate adduct, a ligno-urea-aminoacid adduct, a lignosulphonate-urea-aminoacid adduct, a ligno-urea-chondroitin sulphate adduct, a lignosulphonate-urea-chondroitin sulphate adduct, a ligno-urea-polyhydroxycarboxylate adduct, a lignosulphonate-urea-polyhydroxycarboxylate adduct, or a combination thereof.

In some embodiments, a fertilizer may be in the form of a controlled release nitrogen fertilizer, a controlled release nitrogen/phosphorous/potassium (NPK) fertilizer, a controlled release hydrogel fertilizer, or combination thereof. In some embodiments, a fertilizer may be a high-nitrogen or a high-nitrogen/phosphorous/potassium (NPK) fertilizer. In some embodiments, a fertilizer may be in the form of soil stabilizers or soil improvers for hydrophobic soils.

DETAILED DESCRIPTION

Described herein are methods for producing lignin-based multipurpose fertilizers. In some embodiments, lignin-based starting material may be sourced from waste pulp streams including black liquor and spent pulp liquor. In some embodiments, lignin-based starting material may be converted to methylols.

In an embodiment, a method of preparing a lignosulphonate methylol may comprise contacting lignosulphonate with an aldehyde compound to produce the lignosulphonate methylol. The lignosulphonate may comprise spent pulp liquor, sulphonated black liquor, or a combination thereof. The solid content of the spent pulp liquor or sulphonated black liquor may be adjusted to about 30% to about 60% by weight, to about 35% to about 55% by weight, or to about 40% to about 50% by weight, or about 45% to about 50% by weight, prior to contacting the lignosulphonate with the aldehyde compound. Specific examples of solid content include about 30%, about 35%, about 40%, about 45%, about 50%, about 55%, about 60%, and ranges between any two of these values (for example, from about 30% to about 40%). The net active weight of lignin in the black liquor may be determined from the total organic content as measured by thermal analysis of a sample of the black liquor dried at about 100° C. for about 3 hours. The net active content ratio of the lignosulphonate to the aldehyde compound may be about 1:1 to about 20:1, about 1:1 to about 15:1, about 2:1 to about 15:1, about 2:1 to about 10:1, about 2:1 to about 7.5:1, or about 2.5:1 to about 5:1. Specific examples of ratios include about 1:1, about 2:1, about 2.5:1, about 5:1, about 7.5:1, about 10:1, about 12.5:1, about 15:1, about 17.5:1, about 20:1, and ranges between any two of these values (for example, from about 10:1 to about 17.5:1). In some embodiments, the aldehyde compound may be formaldehyde, paraformaldehyde, or trioxane.

In some embodiments, the lignosulphonate may be contacted with the aldehyde compound at a pH of about 8 to about 12, at a pH of about 9 to about 11, or at a pH of about 9.5 to about 10.5. In some embodiments, the lignosulphonate may be contacted with the aldehyde compound at a pH of about 9 to about 10. Specific examples of pH include about 8, about 8.5, about 9, about 9.5, about 10, about 10.5, about 11, about 11.5, about 12, and ranges between any two of these values (for example, from about 9 to about 11). The lignosulphonate may be contacted with the aldehyde compound at a temperature of about 50° C. to about 85° C., about 55° C. to about 80° C., about 60° C. to about 75° C., or about 65° C. to about 70° C. In some embodiments, the lignosulphonate may be contacted with the aldehyde compound at a temperature of about 65° C. to about 70° C. Specific examples of temperatures include about 50° C., about 55° C., about 60° C., about 65° C., about 70° C., about 75° C., about 80° C., about 85° C., and ranges between any two of these values (for example, from about 65° C. to about 80° C.). The lignosulphonate may be contacted with the aldehyde compound for about 2 to about 5 hours, about 2.5 to about 4.5 hours, or about 3 to about 4 hours. In some embodiments, the lignosulphonate may be contacted with the aldehyde compound for about 3 to about 4 hours. In some embodiments, the lignosulphonate may be contacted with the aldehyde compound for about 3 hours.

Specific examples of contact time include about 2 hours, about 2.5 hours, about 3 hours, about 3.5 hours, about 4 hours, about 4.5 hours, about 5 hours, and ranges between any two of these values (for example, from about 3.5 hours to about 4.5 hours). In some embodiments, higher temperatures may be synchronised with lower reaction times. In some embodiments heating for more than about 3 hours may occur with reaction temperatures below about 60° C. At higher temperatures and longer reaction times, the methylol resins may condense and form a bulk of highly crosslinked thermoset resin.

In some embodiments, the lignosulphonate methylol may comprise lignosulphonate monomethylol, lignosulphonate dimethylol, lignosulphonate trimethylol, or lignosulphonate oligomethylol. In further embodiments, the lignosulphonate methylol may be cooled to about 0° C. to about 10° C., or to about 0° C. to about 5° C. In further embodiments, the lignosulphonate methylol may be cooled to about 0° C. to about 10° C. In some embodiments, the lignosulphonate methylol may be cooled to about 0° C. to about 5° C. Specific examples of cooled temperatures include about 0° C., about 5° C., about 10° C., and ranges between any two of these values (for example, from about 5° C. to about 10° C.).

The cooled lignosulphonate methylol may be neutralized with a pre-cooled acid, which may be at about 0° C. to about 10° C., and may be about 2% to about 15% or about 5% to about 10% acid, by weight. In some embodiments, the pre-cooled acid may be at about 0 to about 5° C. Specific cooled temperatures include about, about 0° C., about 5° C., about 10° C., and ranges between any two of these values (for example, from about 0° C. to about 5° C.). Specific concentration examples include about 2% by weight, about 5% by weight, about 7% by weight, about 10% by weight, and ranges between any two of these values (for example, from about 5% to about 10%). In some embodiments, the cooled lignosulphonate methylol may be neutralized to a pH of about 6.8 to about 7.2, to a pH of about 6.9 to about 7.1, or to a pH of about 7. In some embodiments, the cooled lignosulphonate methylol may be neutralized to a pH of about 7. In some embodiments, the pre-cooled acid may be phosphoric acid, paratoluenesulphonic acid, hydroxy acetic acid, gluconic acid, a hydroxypolycarboxylic acid, or a combination thereof.

In some embodiments, the neutralized, cooled, lignosulphonate methylol may be isolated, and the separated lignosulphonate methylol may be dissolved in at least one alcohol. In some embodiments, the alcohol may be selected from ethanol, methylated spirits, and isobutanol. In further embodiments, the lignosulphonate methylol may be dried. In some embodiments, the alcohol may be evaporated under reduced pressure to produce the lignosulphonate methylol as a solid residue, or semi-solid viscous product, or viscous product. In some embodiments, the lignosulphonate methylol may be dried with molecular sieves before evaporation of the solvent.

In another embodiment, a method of preparing a lignin methylol may comprise contacting lignin with an aldehyde compound at a pH of about 9 to about 10 to produce the lignin methylol. The lignin may comprise black liquor, and the solid content of the black liquor may be adjusted to about 40% to about 70% by weight, to about 45% to about 65% by weight, or to about 50% to about 60% by weight prior to contacting the lignin with the aldehyde compound. Specific examples of solid content include about 40%, about 45%, about 50%, about 55%, about 60%, about 65%, about 70%, and ranges between any two of these values (for example, from about 45% to about 60%). In some embodiments, the solid content of the black liquor may be dependent on the molecular weight of the lignin and its source. The net weight active content ratio of the lignin to the aldehyde compound may be about 1:1 to about 20:1. In some embodiments, the net active content ratio of the lignin to the aldehyde compound may be about 1:1 to about 20:1, about 1:1 to about 15:1, about 2:1 to about 15:1, about 2:1 to about 10:1, about 2:1 to about 7.5:1, or about 2.5:1 to about 5:1. Specific examples of ratios include about 1:1, about 2:1, about 2.5:1, about 5:1, about 7.5:1, about 10:1, about 12.5:1, about 15:1, about 17.5:1, about 20:1, and ranges between any two of these values. In some embodiments, the aldehyde compound may be formaldehyde, paraformaldehyde, or trioxane.

In some embodiments, the lignin may be contacted with the aldehyde compound at a temperature of about 50° C. to about 85° C., about 55° C. to about 80° C., about 60° C. to about 75° C., or about 65° C. to about 70° C. In some embodiments, the lignin may be contacted with the aldehyde compound at a temperature of about 65° C. to about 70° C. Specific examples of temperatures include about 50° C., about 55° C., about 60° C., about 65° C., about 70° C., about 75° C., about 80° C., about 85° C., and ranges between any two of these values (for example, from about 55° C. to about 70° C.). The lignin may be contacted with the aldehyde compound for about 2 to about 5 hours, about 2.5 to about 4.5 hours, or about 3 to about 4 hours. In some embodiments, the lignin may be contacted with the aldehyde compound for about 3 to about 4 hours. In some embodiments, the lignin may be contacted with the aldehyde compound for about 3 hours. Specific examples of contact time include about 2 hours, about 2.5 hours, about 3 hours, about 3.5 hours, about 4 hours, about 4.5 hours, about 5 hours, and ranges between any two of these values (for example, from about 3.5 hours to about 4.5 hours). In some embodiments, higher temperatures may be synchronised with lower reaction times. In some embodiments, heating for more than about 3 hours may occur with reaction temperatures below about 60° C. At higher temperatures and longer reaction times, the methylol resins may condense and form a bulk of highly crosslinked thermoset resin. In some embodiments, the lignin may be contacted with the aldehyde compound at a pH of about 10. Specific examples of pH include about 8, about 8.5, about 9, about 9.5, about 10, about 10.5, and ranges between any two of these values (for example, from about 9 to about 10).

In some embodiments, the lignin methylol may comprise lignin monomethylol, lignin dimethylol, lignin trimethylol, or lignin oligomethylol. In further embodiments, the lignin methylol may be cooled to about 0° C. to about 10° C., or to about 0° C. to about 5° C. In further embodiments, the lignin methylol may be cooled to about 0° C. to about 10° C. In some embodiments, the lignin methylol may be cooled to about 0° C. to about 5° C. Specific examples of cooled temperatures include about 0° C., about 5° C., about 10° C., about 15° C., and ranges between any two of these values (for example, from about 5° C. to about 10° C.). The cooled lignin methylol may be neutralized with a pre-cooled acid, which may be at about 0° C. to about 10° C., and may be about 2% to about 10% or about 5% to about 10% acid, by weight. In some embodiments, the pre-cooled acid may be at about 0 to about 5° C. Specific pre-cooled temperatures include about 0° C., about 0° C., about 5° C., about 10° C., and ranges between any two of these values (for example, from about 0° C. to about 5° C.). Specific concentration examples include about 2% by weight, about 5% by weight, about 7% by weight, about 10% by weight, and ranges between any two of these values (for example, from about 5% to about 7%). In some embodiments, the cooled lignin methylol may be neutralized to a pH of about 6.8 to about 7.2, to a pH of about 6.9 to about 7.1, or to a pH of about 7. In some embodiments, the cooled lignin methylol may be neutralized to a pH of about 7. In some embodiments, the pre-cooled acid may be phosphoric acid.

In some embodiments, the neutralized, cooled, lignin methylol may be isolated, and the separated lignin methylol may be dissolved in at least one alcohol. In some embodiments, the alcohol may be selected from ethanol, methylated spirits and isobutanol. In further embodiments, the lignin methylol may be dried. In some embodiments, the alcohol may be evaporated under reduced pressure to produce the lignin methylol as a solid residue, or semi-solid viscous product, or viscous product. In some embodiments, the lignosulphonate methylol may be dried with molecular sieves.

In an additional embodiment, a method of preparing lignin methylol or lignosulphonate methylol from solid lignin or solid lignosulphonate may comprise dissolving the lignin or lignosulphonate and contacting the dissolved lignin or lignosulphonate with an aldehyde compound to produce the lignin methylol or lignosulphonate methylol. The lignin or lignosulphonate may comprise spent pulp liquor, sulphonated black liquor, black liquor, or a combination thereof. In some embodiments, the lignin or lignosulphonate may be dissolved in a base solution. In these embodiments, the base solution may be about 10% to about 20% by weight, about 12.5% to about 15% by weight sodium hydroxide. The solid content of the spent pulp liquor or sulphonated black liquor may be adjusted to about 40% to about 70% by weight, to about 45% to about 65% by weight, or to about 50% to about 60% by weight prior to contacting the lignosulphonate with the aldehyde compound. Specific examples of solid content include about 40%, about 45%, about 50%, about 55%, about 60%, about 65%, about 70%, and ranges between any two of these values (for example, from about 55% to about 65%). In some embodiments, the net weight active content ratio of the lignin or lignosulphonate to the aldehyde compound may be about 1:1 to about 20:1. In some embodiments, the net active content ratio of the lignin or lignosulphonate to the aldehyde compound may be about 1:1 to about 20:1, about 1:1 to about 15:1, about 2:1 to about 15:1, about 2:1 to about 10:1, about 2:1 to about 7.5:1, or about 2.5:1 to about 5:1. Specific examples of ratios include about 1:1, about 2:1, about 2.5:1, about 5:1, about 7.5:1, about 10:1, about 12.5:1, about 15:1, about 17.5:1, about 20:1, and ranges between any two of these values (for example, from about 2:1 to about 7.5:1). In some embodiments, the aldehyde compound may be formaldehyde.

In some embodiments, the lignin or lignosulphonate may be contacted with the aldehyde compound at a pH of about 9 to about 10. In some embodiments, the lignin or lignosulphonate may be contacted with the aldehyde compound at a pH of about 10. Specific examples of pH include about 8, about 8.5, about 9, about 9.5, about 10, about 10.5 and ranges between any two of these values (for example, from about 9 to about 10). The lignin or lignosulphonate may be contacted with the aldehyde compound at a temperature of about 50° C. to about 85° C., about 55° C. to about 80° C., about 60° C. to about 75° C., or about 65° C. to about 70° C. In some embodiments, the lignin or lignosulphonate may be contacted with the aldehyde compound at a temperature of about 65° C. to about 70° C. Specific examples of temperatures include about 50° C., about 55° C., about 60° C., about 65° C., about 70° C., about 75° C., about 80° C., about 85° C., and ranges between any two of these values (for example, from about 55° C. to about 80° C.). The lignin or lignosulphonate may be contacted with the aldehyde compound for about 2 to about 5 hours, about 2.5 to about 4.5 hours, or about 3 to about 4 hours. In some embodiments, the lignin or lignosulphonate may be contacted with the aldehyde compound for about 3 to about 4 hours. In some embodiments, the lignin or lignosulphonate may be contacted with the aldehyde compound for about 3 hours. Specific examples of contact time include about 2 hours, about 2.5 hours, about 3 hours, about 3.5 hours, about 4 hours, about 4.5 hours, about 5 hours, and ranges between any two of these values (for example, from about 3.5 hours to about 4.5 hours). In embodiments, higher temperatures may be synchronised with lower reaction times. In some embodiments, heating for more than about 3 hours may occur with reaction temperatures below about 60° C. At higher temperatures and longer reaction times, the methylol resins may condense and form a bulk of highly crosslinked thermoset resin.

In some embodiments, the lignosulphonate methylol may comprise lignosulphonate monomethylol, lignosulphonate dimethylol, lignosulphonate trimethylol, or lignosulphonate oligomethylol, and the lignin methylol may be lignin monomethylol, lignin dimethylol, lignin trimethylol, or lignin oligomethylol. In further embodiments, the lignin methylol or lignosulphonate methylol may be cooled to about 0° C. to about 10° C. In further embodiments, the lignin methylol or lignosulphonate methylol may be cooled to about 0° C. to about 10° C., or to about 0° C. to about 5° C. In some embodiments, the lignin methylol or lignosulphonate methylol may be cooled to about 0° C. to about 5° C. Specific examples of cooled temperatures include about 0° C., about 5° C., about 10° C., and ranges between any two of these values (for example, from about 5° C. to about 10° C.). The cooled lignin methylol or lignosulphonate methylol may be neutralized with a pre-cooled acid, which may be at about 0° C. to about 10° C., and may be about 2% to about 7.5% acid, by weight. In some embodiments, the pre-cooled acid may be at about 0 to about 5° C. Specific pre-cooled temperatures include about 0° C., about 5° C., about 10° C., and ranges between any two of these values (for example, from about 5° C. to about 10° C.). Specific concentration examples include about 2% by weight, about 5% by weight, about 7% by weight, about 10% by weight, and ranges between any two of these values (for example, from about 5% to about 10%). In some embodiments, the cooled lignin methylol or lignosulphonate methylol may be neutralized to a pH of about 6.8 to about 7.0, to a pH of about 6.9 to about 7.0, or to a pH of about 7. In some embodiments, the cooled lignin methylol or lignosulphonate methylol may be neutralized to a pH of about 7. In some embodiments, the pre-cooled acid may be phosphoric acid.

In some embodiments, the neutralized, cooled, lignin methylol or lignosulphonate methylol may be isolated, and the separated lignin methylol or lignosulphonate methylol may be dissolved in an alcohol. In some embodiments, the alcohol may be selected from ethanol, methylated spirits and isobutanol. In further embodiments, the lignin methylol or lignosulphonate methylol may be dried. In some embodiments, the alcohol may be evaporated under reduced pressure to produce the lignin methylol or lignosulphonate methylol as a solid residue, or semi-solid viscous product, or viscous product. In some embodiments, the lignin methylol or lignosulphonate methylol may be dried with molecular sieves before evaporating the solvent.

In an embodiment, a method of preparing a lignin-based surfactant may comprise contacting a lignin methylol or lignosulphonate methylol with a reagent to produce the lignin-based surfactant. In some embodiments, the reagent may comprise a hydroxycarboxylic acid compound, polyhydroxycarboxylic acid, a hydroxylamine compound, isocyanate terminated polymers, an amine compound, a phosphate compound, epichlorohydrine, or sodium bisulphite.

In some embodiments, the lignin methylol or lignosulphonate methylol may be contacted with the reagent at about 20° C. to about 60° C., at about 25° C. to about 45° C., or at about 30° C. to about 35° C. In some embodiments, the lignin methylol or lignosulphonate methylol may be contacted with the reagent at about 30° C. to about 35° C. In some embodiments, the lignin methylol or lignosulphonate methylol may be contacted with the reagent at about 30° C. Specific examples of temperatures include about 20° C., about 25° C., about 30° C., about 35° C., about 40° C., about 45° C., about 50° C., about 60° C., and ranges between any two of these values (for example, from about 25° C. to about 35° C.). In some embodiments, the lignin methylol or lignosulphonate methylol may be contacted with the reagent for about 1 hour to about 4 hours, about 1.5 hours to about 3 hours, or about 2 hours. In some embodiments, the lignin methylol or lignosulphonate methylol may be contacted with the reagent for about two hours at about 30° C. Specific examples of contact time include about 1 hour, about 1.5 hours, about 2 hours, about 2.5 hours, about 3 hours, about 4 hours, about 5 hours, and ranges between any two of these values (for example, from about 1.5 hours to about 2.5 hours). Contact time may be determined by routine tests to indicate reaction completion which may be dependent on the reaction temperature and the reagent.

In further embodiments, the lignin methylol or lignosulphonate methylol and the reagent may be refluxed for about 30 minutes to about 120 minutes, about 40 minutes to about 100 minutes, or about 60 minutes to about 80 minutes. In some embodiments, the lignin methylol or lignosulphonate methylol and the reagent may be refluxed for about 1 hour. Specific examples of reflux time include about 1 hour, about 1.5 hours, about 2 hours, about 2.5 hours, about 3 hours, about 4 hours, about 5 hours, and ranges between any two of these values (for example, from about 3 hours to about 5 hours). In some embodiments, the reaction products may be neutralized with a basic solution. In some embodiments, the basic solution may be sodium hydroxide or calcium hydroxide at about 2% to about 20% by weight, about 5% to about 20% by weight, or about 10% to about 20% by weight.

In some embodiments where the reagent comprises at least one carboxylic acid compound, the lignin-based surfactant may be a lignin carboxylate compound or a lignosulphonate carboxylate compound. In some embodiments, the carboxylic acid compound may comprise a polycarboxylic acid, a hydroxycarboxylic acid, hydroxydicarboxylic acid, or polyhydroxycarboxylic acid. In other embodiments, the carboxylic acid compound may comprise gluconic acid, citric acid, tartaric acid, hydroxybutyric acid, hydroxyacetic acid, hydroxymalonic acid, hydroxysuccinic acid, or hydroxyglutamic acid. In some embodiments where the reagent comprises a hydroxyamino compound, the lignin-based surfactant may comprise a lignoethanolamine compound or a lignosulphonate ethanolamine compound. In some embodiments, the hydroxylamine compound may comprise monoethanolamine, diethanolamine, triethanolamine, or hydroxyl amine.

In some embodiments where the reagent comprises an isocyante terminated polymer, the lignin-based surfactant may comprise a lignourethane compound or a lignosulphonate urethane compound as foamed hydrogel water stop product. In some embodiments where the reagent comprises an amine compound, the lignin-based surfactant may comprise a lignoamine compound or a lignosulphonate amine compound. In some embodiments where the reagent comprises a phosphate compound, the lignin-based surfactant may comprise a lignophosphate compound or a lignosulphonate phosphate compound. In some embodiments where the reagent comprises epichlorohydrine, the lignin-based surfactant may comprise a water based lignoepoxy compound or a lignosulphonate epoxy compound. In some embodiments where the reagent comprises sodium bisulphite, the lignin-based surfactant may comprise a lignosulphonate compound.

In another embodiment, a method of preparing a lignin-based surfactant may comprise contacting lignin with a reagent in a lignin/reagent reaction mixture to produce the lignin-based surfactant. In some embodiments, the reagent may comprise a carboxylic acid compound, a hydroxyamino compound, an isocyante terminated polymer, an amine compound, a phosphate compound, epichlorohydrin, or sodium bisulphite. In some embodiments, the lignin may be in the form of black liquor. In these embodiments, the solid content of the black liquor may be adjusted to about 40% to about 70% by weight, to about 45% to about 65% by weight, or to about 50% to about 60% by weight prior to contacting the lignin with a reagent. Specific examples of solid content include about 40%, about 45%, about 50%, about 55%, about 60%, about 65%, about 70%, and ranges between any two of these values (for example, from about 55% to about 65%).

In some embodiments, the lignin may be contacted with the reagent at about 20° C. to about 60° C., at about 25° C. to about 45° C., or at about 30° C. to about 35° C. In some embodiments, the lignin may be contacted with the reagent at about 30° C. to about 35° C. In some embodiments, the lignin may be contacted with the reagent at about 30° C. Specific examples of temperatures include about 20° C., about 25° C., about 30° C., about 35° C., about 40° C., about 45° C., about 50° C., about 60° C., and ranges between any two of these values (for example, from about 25° C. to about 35° C.). In some embodiments, the lignin may be contacted with the reagent for about 1 hour to about 4 hours, about 1.5 hours to about 3 hours, or about 2 hours. In some embodiments, the lignin may be contacted with the reagent for about two hours at about 30° C. Specific examples of contact time include about 1 hour, about 1.5 hours, about 2 hours, about 2.5 hours, about 3 hours, about 4 hours, about 5 hours, and ranges between any two of these values (for example, from about 2.5 hours to about 4 hours).

In further embodiments, the lignin/reagent reaction mixture may be refluxed for about 30 minutes to about 120 minutes, about 40 minutes to about 100 minutes, or about 60 minutes to about 80 minutes. In some embodiments, the lignin/reagent reaction mixture may be refluxed for about 1 hour. Specific examples of reflux time include about 1 hour, about 1.5 hours, about 2 hours, and ranges between any two of these values (for example, from about 1.5 hours to about 2 hours). In some embodiments, the lignin/reagent reaction mixture may be neutralized with a basic solution. In some embodiments, the basic solution may be sodium hydroxide or calcium hydroxide at about 2% to about 20% by weight, about 5% to about 20% by weight, or about 10% to about 20% by weight.

In some embodiments where the reagent comprises at least one carboxylic acid compound, the lignin-based surfactant may be a lignin carboxylate compound. In some embodiments, the carboxylic acid compound may comprise at least one polycarboxylic acid, a hydroxycarboxylic acid, hydroxydicarboxylic acid, polyhydroxycarboxylic acid, or combinations thereof. In other embodiments, the carboxylic acid compound may comprise gluconic acid, citric acid, tartaric acid, hydroxybutyric acid, hydroxyacetic acid, hydroxymalonic acid, hydroxysuccinic acid, hydroxyglutamic acid, or combinations thereof. In some embodiments where the reagent comprises a hydroxyamino compound, the lignin-based surfactant may comprise a lignoethanolamine compound. In some embodiments, the hydroxylamino compound may comprise monoethanolamine, diethanolamine, triethanolamine, hydroxyl amine, or combinations thereof. In some embodiments where the reagent comprises an isocyante terminated polymer, the lignin-based surfactant may comprise a lignourethane compound as a foamed hydrogel water stop product. In some embodiments where the reagent comprises an amine compound, the lignin-based surfactant may comprise a lignoamine compound. In some embodiments where the reagent comprises a phosphate compound, the lignin-based surfactant may comprise a lignophosphate compound. In some embodiments where the reagent comprises epichlorohydrine, the lignin-based surfactant may comprise a water based lignoepoxy compound. In some embodiments where the reagent comprises sodium bisulphite, the lignin-based surfactant may comprise a lignosulphonate compound with a high degree of sulphonation.

In another embodiment, a method of preparing lignocarboxylate or lignosulphonate carboxylate may comprise contacting lignin or lignosulphonate with carbon dioxide to produce lignocarboxylate or lignosulphonate carboxylate. In some embodiments, the carbon dioxide may be a gas or in the form of dry ice. In other embodiments, the carbon dioxide may be carbon dioxide adducts formed by carbon dioxide absorbers which are formed in the reclaiming processes of carbon dioxide from the atmosphere or from industrial sources. In some embodiments, the lignin may comprise black liquor and the lignosulphonate may be in the form of spent pulp liquor, sulphonated black liquor, or a combination thereof. In some embodiments, the solid content of the black liquor, spent pulp liquor or sulphonated black liquor may be adjusted to may be adjusted to about 40% to about 70% by weight, to about 45% to about 65% by weight, or to about 50% to about 60% by weight prior to contacting the lignin or lignosulphonate with carbon dioxide. Specific examples of solid content include about 40%, about 45%, about 50%, about 55%, about 60%, about 65%, about 70%, and ranges between any two of these values (for example, from about 55% to about 65%).

In some embodiments, the lignin or lignosulphonate may be contacted with the carbon dioxide under a pressure of about 90 atm to about 150 atm, about 100 atm to about 130 atm, or about 100 atm to about 120 atm. In some embodiments, the lignin or lignosulphonate may be contacted with the carbon dioxide under a pressure of about 100 atm. In some embodiments, the lignin or lignosulphonate may be contacted with the carbon dioxide at a temperature of about 100° C. to about 160° C., about 110° C. to about 140° C., or about 120° C. to about 130° C. In some embodiments, the lignin or lignosulphonate may be contacted with the carbon dioxide at a temperature of about 125° C. Specific examples of temperatures include about 100° C., about 115° C., about 120° C., about 125° C., about 130° C., about 140° C., about 150° C., about 160° C., and ranges between any two of these values (for example, from about 120° C. to about 140° C.). In some embodiments, the lignin or lignosulphonate may be contacted with the carbon dioxide for about 2 hours to about 8 hours, about 3 hours to about 7 hours, or about 4 hours to about 6 hours. In some embodiments, the lignin or lignosulphonate may be contacted with the carbon dioxide for about 5 hours. Specific examples of contact time include about 2 hours, about 3 hours, about 4 hours, about 4.5 hours, about 5 hours, about 5.5 hours, about 6 hours, about 7 hours, about 8 hours, and ranges between any two of these values (for example, from about 4.5 hours to about 5.5 hours). In some embodiments, the contacting may take place in an autoclave with a rotating mix.

In an embodiment, a method of preparing a lignin-based surfactant may comprise contacting a lignin-based material with a carbohydrate or carbohydrate derivative in the presence of a catalyst to produce the lignin-based surfactant. In some embodiments, the lignin-based material may be lignin methylol, lignosulphonate methylol, lignin, lignosulphonate, or any combination thereof. In some embodiments, the carbohydrate may be dextrose syrup, glucose syrup, or sucrose syrup. In these embodiments, the source of the carbohydrate may be include, but is not limited to, dates, sorbitol, maltose, or a combination thereof. In some embodiments, the carbohydrate derivative may be: a polyhydroxy carboxylic acid; a hydroxyl polycarboxylic acid, including but not limited to, hydroxymono carboxylic acids, hydroxydicarboxylic acids, hydroxytetracarboxylic acids, and hydroxypolycarboxylic acids; an aminocarboxylic acid, including but limited to, aminomono carboxylic acids, aminodi carboxylic acids, aminotri carboxylic acids, aminotetra carboxylic acids; a lithium, sodium, potassium, ammonium or calcium salt thereof; or other natural carboxylic acid or salt thereof derived by oxidation or fermentation of a carbohydrate. Specific examples of carbohydrates and carbohydrate derivatives include sodium gluconate, sodium glutamate, hydroxyl sodium acetate, citric acid, tartaric acid, hydroxyl acetic acid, gluconic acid, and glutamic acid. The carbohydrates and carbohydrate derivatives may be obtained or derived from natural resources including, for example, dates, sugar cane waste, olive oil wastes, and others sugar and oil containing wastes.

In some embodiments, the ratio of lignin-based material to carbohydrate or carbohydrate derivative may be about 1:1 to about 1:1.2 based on moles of methylol groups in the lignin-based material to moles of the carbohydrate or carbohydrate derivative. In some embodiments, the ratio of lignin-based material to carbohydrate or carbohydrate derivative may be about 1:1. Specific examples of ratios include about 1:1.1, about 1:1.2, about 1:1.3 molar ratio and ranges between any two of these values (for example, from about 1:1 to about 1:1.1). In some embodiments, the catalyst may be phosphoric acid or paratoluene sulphonic acid.

In some embodiments, contacting the lignin-based material with the carbohydrate or carbohydrate derivative occurs with heating by a microwave or in a water bath. In some embodiments, the microwave may be a kitchen type microwave with an output of about 1100 watts to about 1500 watts. In some embodiments, the lignin-based material may be contacted with the carbohydrate or carbohydrate derivative at about 40° C. to about 60° C., at about 45° C. to about 55° C. In some embodiments, the lignin-based material may be contacted with the carbohydrate or carbohydrate derivative at about 50° C. Specific examples of temperatures include about 40° C., about 45° C., about 50° C., about 55° C., about 60° C., and ranges between any two of these values (for example, from about 40° C. to about 60° C.). In some embodiments, the lignin-based material may be contacted with the carbohydrate or carbohydrate derivative for about 0.5 hour to about 2 hours, about 1 hour to about 1.5 hours. In some embodiments, the lignin-based material may be contacted with the carbohydrate or carbohydrate derivative for about 0.5. Specific examples of contact time include about 0.5 hours, about 1 hours, about 1.0 hours, about 1.5 hours, about 4 hours, about 5 hours, and ranges between any two of these values (for example, from about 0.5 hours to about 2 hours).

In an embodiment, a method of preparing a lignin-based surfactant may comprise contacting a lignin-based material with an amino acid in a solvent to produce the lignin-based surfactant. In some embodiments, the lignin-based material may be lignin methylol, lignosulphonate methylol, lignin, or any combination thereof. In some embodiments, the amino acid may be the sodium salt of arginine, leucine, lysine, glycine, glutamic acid, aspartic acid, contrition sulfate, or a combination thereof. In some embodiments, the ratio of lignin-based material to amino acid may be about 1:1 to about 1:1.3 based on moles of methylol groups in the lignin-based material to moles of the amino acid. In some embodiments, the ratio of lignin-based material to amino acid may be about 1:1.1. Specific examples of ratios include about 1:1, about 1:1.2, about 1:1.3, and ranges between any two of these values (for example, from about 1:1 to about 1:1.2). In some embodiments, the solvent may be triethylamine or a mixture of triethylamine with n-butanol.

In some embodiments, contacting the lignin-based material with the amino acid occurs at about 50° C. to about 70° C. for about 3 hours to about 4.0 hours with efficient mixing. In some embodiments, contacting the lignin-based material with the amino acid occurs at about 60° C. for about 3 hours with efficient mixing. Specific examples of temperatures include about 50° C., about 55° C., about 60° C., about 65° C., about 70° C. and ranges between any two of these values (for example, from about 60° C. to about 65° C.). Specific examples of contact time include about 3 hours, about 3.2 hours, about 3.4 hours, about 3.5 hours, about 4 hours and ranges between any two of these values (for example, from about 3.0 hours to about 4.0 hours).

Gemini surfactants represent a class of surfactants made up of two identical or different amphiphilic moieties having the structure of conventional surfactants connected by a spacer group. The spacer may be hydrophobic (aliphatic or aromatic) or hydrophilic (polyether), short (two methylene groups) or long (up to 20 and more methylene groups), rigid (stilbene) or flexible (polymethylene chain). In an embodiment, a method of preparing a Gemini lignin-based surfactant may comprise contacting a lignin-based material with an amino acid in a solvent to produce the Gemini lignin-based surfactant, wherein the number of reacted methylol groups in lignin molecule with the amino acid may be two or more. In some embodiments, the lignin-based material may be lignin methylol, lignosulphonate methylol, or any combination thereof. In some embodiments, the amino acid may be the sodium salt of arginine, leucine, lysine, glycine, glutamic acid, aspartic acid, contrition sulfate, or a combination thereof. In some embodiments, the ratio of lignin-based material to amino acid may be from about 1:1 to about 1:1.3 based on moles of methylol groups in the lignin-based material to the amino acid. In some embodiments, the ratio of lignin-based material to amino acid may be about 1:1. Specific examples of ratios include about 1:1, about 1:1.1, about 1:1.2, about 1:1.3, and ranges between any two of these values (for example, from about 1:1 to about 1:1.2). In some embodiments, the solvent may be triethylamine or a mixture of triethylamine with n-butanol.

In some embodiments, contacting a lignin-based material with an amino acid occurs at about 50° C. to about 70° C. for about 3 hours to about 4.0 hours. In some embodiments, contacting a lignin-based material with an amino acid occurs at about 60° C. for about 3 hours. Specific examples of temperatures include about 50° C., about 55° C., about 60° C., about 65° C., about 70° C. and ranges between any two of these values (for example, from about 60° C. to about 65° C.). Specific examples of contact time include about 3 hours, about 3.2 hours, about 3.4 hours, about 3.5 hours, about 4 hours, and ranges between any two of these values (for example, from about 3.0 hours to about 4.0 hours).

In an embodiment, a method of preparing a Gemini lignin-based surfactant may comprise contacting a lignin-based material with an ethylene diamine derivative reactant to produce the Gemini lignin-based surfactant, wherein the number of reacted methylol groups in a lignin molecule with the ethylene diamine derivative may be two or more. In some embodiments, the lignin-based material may be lignin methylol, lignosulphonate methylol, or any combination thereof. In some embodiments, the ethylene diamine derivative reactant may be ethylene diamine, diethylenetriamine, triethylenetetramine, or tetraethylenepentamine or polyethylenediamine. In some embodiments, the ratio of lignin-based material to ethylene diamine reactant may be about 1:1 to about 1:1.3 based on moles of methylol groups in the lignin-based material to moles of the ethylene diamine derivatives. In some embodiments, the ratio of lignin-based material to ethylene diamine derivative reactant may be about 1:1. Specific examples of ratios include about 1:1, about 1:1.1, about 1:1.2, about 1:1.2, and ranges between any two of these values (for example, from about 1:1 to about 1:1.2).

In some embodiments, contacting the lignin-based material with the ethylene diamine derivative occurs at about 50° C. to about 70° C. for about 3 hours to about 4.0 hours. In some embodiments, contacting the lignin-based material with the ethylene diamine derivative occurs at about 60° C. to about 70° C. for about 3 hours. Specific examples of temperatures include about 50° C., about 60° C., about 65° C., about 70° C., and ranges between any two of these values (for example, from about 60° C. to about 65° C.). Specific examples of contact time include about 3 hours, about 3.2 hours, about 3.4 hours, about 3.5 hours, about 4 hours and ranges between any two of these values (for example, from about 3.0 hours to about 4.0 hours).

In an embodiment, a method of preparing a lignin-based surfactant may comprise contacting a lignin-based material with polyethylene oxide terminated with epoxide groups in the presence of a catalyst to produce the lignin-based surfactant, wherein the number of reacted methylol groups with the ethylene diamine derivative may be two or more. In some embodiments, the lignin-based material may be lignin methylol, lignosulphonate methylol, or any combination thereof. In some embodiments, the polyethylene oxide terminated with epoxide groups has a molecular weight (Mn) of about 200 to about 600. In some embodiments, the ratio of lignin-based material to polyethylene oxide may be about 1:1 to about 1:1.3 based on moles of methylol groups in the lignin-based material to moles of the polyethylene oxide. In some embodiments, the ratio of lignin-based material to polyethylene oxide may be about 1:1. Specific examples of ratios include about 1:1, about 1:1.1, about 1:1.2, about 1:1.2, and ranges between any two of these values (for example, from about 1:1 to about 1:1.2). In some embodiments the catalyst may be phosphoric acid, p-toluene sulphonic acid, or diamino compounds such as ethylene diamine and its derivatives.

In some embodiments, contacting the lignin-based material with the polyethylene oxide occurs at about 50° C. to about 70° C. for about 3 to about 4 hours. Specific examples of temperatures include about 50° C., about 55° C., about 60° C., about 65° C., about 70° C. and ranges between any two of these values (for example, from about 55° C. to about 65° C.). Specific examples of contact time include about 3 hours, about 3.2 hours, about 3.4 hours, about 3.5 hours, and ranges between any two of these values (for example, from about 3.0 hours to about 4.0 hours).

In an embodiment, a method of preparing a lignin-based surfactant may comprise contacting a lignin-based material with a silicon compound to produce the lignin-based surfactant. In some embodiments, the lignin-based material may be lignin methylol, lignosulphonate methylol, or any combination thereof. In some embodiments, the silicon compound may be silicon oil terminated with active siloxane groups. Specific examples of active siloxanes may be, but are not limited to, epoxide siloxanes and aziridine siloxanes. In some embodiments, the ratio of lignin-based material to silicon compound may be about 1:1 about 1:1.3 based on moles of methylol groups in the lignin-based material to moles of siloxanating agents. In some embodiments, the ratio of lignin-based material to silicon compound may be about 1:1. Specific examples of ratios include about 1:1, about 1:1.2, about 1:1.3, and ranges between any two of these values (for example, from about 1:1 to about 1:1.2).

In some embodiments, contacting the lignin-based material with the silicon compound occurs at about room temperature for about 6 hours to about 12 hours. Specific examples of temperatures include about 20° C., about 23° C., about 25° C., about 30° C., and ranges between any two of these values (for example, from about 23° C. to about 25° C.). Specific examples of contact time include about 6 hours, about 8 hours, about 10 hours, about 12 hours, and ranges between any two of these values (for example, from about 8 hours to about 10 hours).

In an embodiment, a lignin-based surfactant may comprise a lignoamino acid salt compound, a lignosulphonate amino acid salt compound, a lignosilicone compound, a lignosulphonate silicone compound, a ligno-functionalized polymer compound, a lignosulphonate-functionalized polymer compound, a lignosaccharide compound, a lignosulphonate saccharide compound, a lignoethylendiamine derivative compound, a lignosulphonate ethylendiamine derivative compound, a lignoethanolamine derivative compound, lignosulphonate ethanolamine derivative compounds, a lignoglycoside, a lignosulphonate glycoside, or a combination thereof.

In an embodiment, a method of preparing a controlled release fertilizer comprises contacting a lignin-based material with at least one reagent comprising a methylol of a nitrogen-based compound to produce a mixture comprising the controlled release fertilizer. In some embodiments, the lignin-based material is lignin methylol or lignosulphonate methylol, or a combination thereof. In some embodiments, the at least one reagent may further comprise at least one crosslinking agent.

In some embodiments, the lignin-based material may have about 1 to about 4 methylol groups per lignin unit. In some embodiments, the molar ratio of the lignin-based material to the at least one reagent may be about 1:1 to about 1:1.3 based on the number of methylol groups in the lignin-based material and the number of methylol groups in the at least one reagent. In some embodiments, the molar ratio of the lignin-based material to the at least one reagent may be about 1:1. Specific examples of ratios include about 1:1, about 1:1.2, about 1:1.3, and ranges between any two of these values (for example, from about 1:1 to about 1:1.2).

In some embodiments, contacting the lignin-based material with the at least one reagent occurs at about 50° C. to about 70° C. for about 60 minutes to about 90 minutes In some embodiments, contacting the lignin-based material with the at least one reagent occurs at about 60° C. for about 1 hour. Specific examples of temperatures include about 50° C., about 55° C., about 60° C., about 65° C., about 70° C. and ranges between any two of these values (for example, from about 55° C. to about 65° C.). Specific examples of contact time include about 1 hours, about 1.25 hours, about 1.5 hours, and ranges between any two of these values (for example, from about 1 hours to about 1.5 hours).

In some embodiments, an amount of surfactant may be added to the mixture comprising the controlled release fertilizer. In some embodiments, the surfactant is a lignin-based surfactant. In some embodiments, the lignin-based surfactant is a lignocarboxylate, a lignosulphonate carboxylate, a lignoethanolamine, a lignosulphonate ethanolamine, a lignoglucoside, a lignosulphonate glucoside, a lignoamino acid, or a lignosulphonate amino acid. In some embodiments, the amount of the surfactant is about 2 weight percent to about 5 weight percent depending on the soil wettability required.

In some embodiments, the mixture comprising the controlled release fertilizer may be cooled. In these embodiments, the cooled mixture comprising the controlled release fertilizer may then be filtered and then may be dried to produce a solid. In some embodiments, the solidified mixture may then be ground. In further embodiments, the ground mixture may be sieved.

In an embodiment, a method of preparing a hydrogel controlled release fertilizer comprises contacting a lignin-based material with at least one reagent to produce a mixture comprising the hydrogel controlled release fertilizer, wherein the at least one reagent may comprise a methylol of a nitrogen-based compound, a crosslinking agent, a hydrogel forming material, or a combination thereof. In some embodiments, the lignin-based material is lignin methylol or lignosulphonate methylol, or a combination thereof.

In some embodiments, the lignin-based material may have about 1 to about 4 methylol groups per lignin unit. In some embodiments, the molar ratio of the lignin-based material to the methylol of a nitrogen-based compound may be about 1:1 to about 1:1.3 based on the number of methylol groups in the lignin-based material and the number of methylol groups in the methylol of a nitrogen-based compound. In some embodiments, the molar ratio of the lignin-based material to the methylol of a nitrogen-based compound may be about 1:1. Specific examples of ratios include about 1:1, about 1:1.2, about 1:1.3, and ranges between any two of these values (for example, from about 1:1 to about 1:1.2).

In some embodiments, the crosslinking agent may be about 0.5 weight percent to about 1.5 weight percent of the mixture comprising the hydrogel controlled release fertilizer. Specific examples for amount of crosslinking agent include about 0.5 weight percent, about 0.75 weight percent, about 1 weight percent, about 1.25 weight percent, about 1.5 weight percent, and ranges between any two of these values (for example, from about 1 weight percent to about 1.5 weight percent.

In some embodiments, the of hydrogel material may be about 5 weight percent to about 15 weight percent of the mixture comprising the hydrogel controlled release fertilizer. Specific examples of crosslinking agent include about 5 weight percent, about 7 weight percent, about 10 weight percent, about 12 weight percent, about 15 weight percent, and ranges between any two of these values (for example, from about 10 weight percent to about 15 weight percent.

In some embodiments, contacting the lignin-based material with the at least one reagent occurs at about 50° C. to about 70° C. for about 60 minutes to about 90 minutes In some embodiments, contacting the lignin-based material with the at least one reagent occurs at about 60° C. for about 1 hour. Specific examples of temperatures include about 50° C., about 55° C., about 60° C., about 65° C., about 70° C. and ranges between any two of these values (for example, from about 60° C. to about 65° C.). Specific examples of contact time include about 1 hours, about 1.25 hours, about 1.5 hours, and ranges between any two of these values (for example, from about 1 hours to about 1.5 hours).

In some embodiments, an amount of surfactant may be added to the mixture comprising the hydrogel controlled release fertilizer. In some embodiments, the surfactant is a lignin-based surfactant. In some embodiments, the lignin-based surfactant is a lignocarboxylate, a lignosulphonate carboxylate, a lignoethanolamine, a lignosulphonate ethanolamine, a lignoglucoside, a lignosulphonate glucoside, a lignoamino acid, or a lignosulphonate amino acid. In some embodiments, the amount of the surfactant is about 2 weight percent to about 5 weight percent.

In some embodiments, the mixture comprising the controlled release fertilizer may be cooled to produce a suspension comprising the hydrogel controlled release fertilizer. In these embodiments, the hydrogel controlled release fertilizer may be used as a liquid fertilizer. In other embodiments cooling the mixture comprising the hydrogel controlled release fertilizer may produce a solid. In these embodiments, the solidified mixture may be ground. In further embodiments, the ground mixture may be sieved.

In embodiments, a methylol of a nitrogen-based compound, a crosslinking agent, and a hydrogel forming material may comprise a single compound, two different compounds, or three different compounds. For example, some methylols of nitrogen-based compounds may also be crosslinking agents, hydrogel forming materials, or both, and some crosslinking agents may also be hydrogel forming materials.

In embodiments, a methylol of a nitrogen-based compound may be selected from a methylol urea; a methylol of linear urea formaldehyde; a methylol biuret; a methylol of polyurea; a methylol of polyurea formaldehyde in the presence of a methylolamine co-reactant from dihydroxy urea; a methylol of polyurea in the presence of a methylolamine co-reactant from dihydroxy urea; a methylol of a polyaminoacid salt; a methylol of chondroitin sulphate; a methylol of chondroitin; a methylol of an amino acid salt; a methylol of a polyaminoacid; a di-methylol polyurea; a tri-methylol polyurea; a tetra-methylol polyurea; an oligo-methylol polyurea; a di-methylol polyureaformaldehyde; a tri-methylol polyureaformaldehyde; a tetra-methylol polyureaformaldehyde; an oligo-methylol polyureaformaldehyde; a di-methylol urea; a tri-methylol urea; a tetra-methylol urea; an oligo-methylol urea; a di-methylol polyacrylamide; a tri-methylol polyacrylamide; a tetra-methylol polyacrylamide; an oligo-methylol polyacrylamide; a di-methylol of a polyamio acid salt condensate; a tri-methylol of a polyamio acid salt condensate; a tetra-methylol of a polyamio acid salt condensate; an oligo-methylol of a polyamio acid salt condensate; a di-methylol of an amino acid; tri-methylol of an amino acid; a tetra-methylol of an amino acid; an oligo-methylol of an amino acid; a di-methylol of chondroitin sulphate; a tri-methylol of chondroitin sulphate; a tetra-methylol of chondroitin sulphate; an oligo-methylol of chondroitin sulphate; a di-methylol of chondroitin; a tri-methylol of chondroitin; a tetra-methylol of chondroitin; an oligo-methylol of chondroitin; a di-methylol biuret; a tri-methylol biuret; a tetra-methylol biuret; an oligo-methylol biuret; dimethylol acrylamide; and combinations thereof.

In some embodiments, the methylol of a nitrogen-based compound may be prepared by methylolating a precursor compound comprising urea, biuret, a polyurea, a polyurea formaldehyde, an acrylamide, a polyacrylamide, chondroitin, chondroitin sulfate, an amino acid, an amino acid salt, or any combination thereof. In some embodiments, the precursor compound may be contacted with formaldehyde at a molar ratio of about 1:2.5 to produce a mixture comprising the methylol of a nitrogen-based compound. The molar ratio of the precursor compound to formaldehyde may be about 1:1 to about 1:3, about 1:1 to about 1:2.5, about 1:1 to about 1:2, or about 1:1 to about 1:1.5. Specific examples of ratios include about 1:1, about 1:1.5, about 1:2, about 1:2.5, about 1:3, and ranges between any two of these values (for example, from about 1:2 to about 1:2.5).

In some embodiments, the precursor compound may be contacted with formaldehyde at a pH of about 8 to about 11, at a pH of about 9 to about 11, or at a pH of about 9.5 to about 10.5. Specific examples of pH include about 8, about 8.5, about 9, about 9.5, about 10, about 10.5, about 11, and ranges between any two of these values (for example, from about 9 to about 11). In some embodiments, the precursor compound may be contacted with formaldehyde at a pH of about 9 to about 10.

In some embodiments, contacting the precursor compound with formaldehyde occurs at about 50° C. to about 70° C. for about 1 to about 4 hours. In some embodiments, contacting the precursor compound with formaldehyde occurs at about 60° C. to about 65° C. for about 2 to about 3 hours. Specific examples of temperatures include about 50° C., about 55° C., about 60° C., about 65° C., about 70° C., and ranges between any two of these values (for example, from about 55° C. to about 65° C.). Specific examples of contact time include about 1 hour, about 2 hours, about 3 hours, about 4 hours, and ranges between any two of these values (for example, from about 3 hours to about 4 hours).

In some embodiments, the mixture comprising the methylol of a nitrogen-based compound may be cooled to a temperature of about 0° C. to about 5° C. Specific examples of temperatures include about 0° C., about 1° C., about 2° C., about 3° C., about 4° C., about 5° C., and ranges between any two of these values (for example, from about 3° C. to about 5° C.). In these embodiments, the cooled mixture may be neutralized with pre-cooled phosphoric acid, aminocarboxylic acid, or hydroxyl carboxylic acid, wherein the pre-cooled phosphoric acid is at a temperature of about 0° C. to about 10° C. Specific examples of temperatures include about 0° C., about 2° C., about 4° C., about 6° C., about 8° C., about 10° C., and ranges between any two of these values (for example, from about 6° C. to about 10° C.). In some embodiments, the neutralized mixture may be dried under reduced pressure to produce the methylol of a nitrogen-based compound.

In embodiments, a crosslinking agent may be selected from a di-methylol polyureas a tri-methylol polyurea; a tetra-methylol polyurea; an oligo-methylol polyurea; a di-methylol polyureaformaldehyde; a tri-methylol polyureaformaldehyde; a tetra-methylol polyureaformaldehyde; an oligo-methylol polyureaformaldehyde; a di-methylol urea; a tri-methylol urea; a tetra-methylol urea; an oligo-methylol urea; a di-methylol polyacrylamide; a tri-methylol polyacrylamide; a tetra-methylol polyacrylamide; an oligo-methylol polyacrylamide; a di-methylol of a polyamio acid salt condensate; a tri-methylol of a polyamio acid salt condensate; a tetra-methylol of a polyamio acid salt condensate; an oligo-methylol of a polyamio acid salt condensate; a di-methylol of an amino acid; tri-methylol of an amino acid; a tetra-methylol of an amino acid; an oligo-methylol of an amino acid; a di-methylol of chondroitin sulphate; a tri-methylol of chondroitin sulphate; a tetra-methylol of chondroitin sulphate; an oligo-methylol of chondroitin sulphate; a di-methylol of chondroitin; a tri-methylol of chondroitin; a tetra-methylol of chondroitin; an oligo-methylol of chondroitin; a di-methylol biuret; a tri-methylol biuret; a tetra-methylol biuret; an oligo-methylol biuret; dimethylol acrylamide; an isocyanate terminated polyol; a polyhydroxy carboxylic acid; a polyamino acid; chondroitin; chondroitin sulphate; and combinations thereof.

In embodiments, a hydrogel forming material may be selected from methylolpolyacrylamide; polyaminoacids; methylolpolyaminoacids; chondroitin; chondroitin sulphate; methylol chondroitin; methylolchondroitin sulphate; polyhydroxy carboxylic acids; and combinations thereof.

In embodiments, a fertilizer may comprise a lignourea adduct, a lignosulphonate urea adduct, a lignopolyurea adduct, a lignosulphonate polyurea adduct, a lignobiuret adduct, lignosulphonate biuret adduct, a lignopolyureaformaldehyde adduct, a lignosulphonate polyureaformaldehyde adduct, a lignoaminoacid adduct, a lignosulphonate aminoacid adduct, a lignochondroitinsulphate adduct, a lignosulphonate chondroitinsulphate adduct, a lignopolyureapolyacrylate adduct, a lignosulphonate polyureapolyacrylate adduct, a ligno-urea-aminoacid adduct, a lignosulphonate-urea-aminoacid adduct, a ligno-urea-chondroitinsulphate adduct, a lignosulphonate-urea-chondroitinsulphate adduct, a ligno-urea-polyhydroxycarboxylate adduct, a lignosulphonate-urea-polyhydroxycarboxylate adduct, or a combination thereof. In some embodiments, a fertilizer may be in the form of a controlled release nitrogen fertilizer, a controlled release nitrogen/phosphorous/potassium (NPK) fertilizer, a controlled release hydrogel fertilizer, or combination thereof. In some embodiments, a fertilizer may be a high-nitrogen or a high-nitrogen/phosphorous/potassium (NPK) fertilizer. In some embodiments, a fertilizer may be in the form of soil stabilizers or soil improvers for hydrophobic soils.

EXAMPLES

Example 1

Conversion of Black Liquor-sourced Lignin to Methylol Lignin

Black liquor (1 L) with 50% to 60% solid content and a pH range of 9 to 13 was treated with varying amounts (100, 200, 400, 600, and 800 mL) of a formaldehyde solution (36% to 38% formaldehyde content [wt./vol]) to achieve lignin:formaldehyde net ratios of 20:1, 10:1, 5:1, 3.6:1, and 2.5:1. Each reaction was carried out in a five necked flanged top reaction vessel fitted with efficient mechanical stirrer immersed in thermo stated water bath. The effects of reaction pH, temperature, time, and reactant ratio on the concentration of methylols formed were investigated. The concentration of methylol lignin was determined in the reaction mixture by colorimetric techniques using ceric ammonium nitrate and differential scanning calorimetry. Among the tested parameters, a reaction time of 3 hours with a pH of 10, a temperature of 65-70° C., and a lignin:formaldehyde net active content ratio of 5:1 gave the highest concentration of ligno methylol derivatives. The obtained lignin methylol derivatives could be used in situ or separated from the solution and stabilized.

TABLE 1-1

Effect of weight ratio of lignin:aldehyde on the number of methylol groups per structural unit of lignin as determined by colorimetric and DSC.

| Exp. | Wt. ratio Lignin:aldehyde | Temperature ° C. | Reaction time (h) | pH | Increase $CH_2OH$/Structural unit of lignin. | Average of 3 exp | Increase Number of $CH_2OH$ |
|---|---|---|---|---|---|---|---|
| C-1 to C-3 | 20:1 | 65-70 | 3.0 | 9-10 | 0.25-0.75 | 0.56 | 1.0 |
| C-4 to C-6 | 10:1 | 65-70 | 3.0 | 9-10 | 1.54-1.87 | 1.75 | 2.0 |
| C-7 to C-9 | 5:1 | 65-70 | 3.0 | 9-10 | 2.59-3.4 | 2.83 | 3.0 |
| C-10 to C-12 | 3.6:1* | 65-70 | 3.0 | 9-10 | 2.84-3.3 | 2.86 | 3.0 |
| C-13 to C-15 | 2.5:1* | 65-70 | 3.0 | 9-10 | 2.94-3.4 | 2.98 | 3.0 |

*Excess of unreacted formaldehyde was found in the reaction mixture

TABLE 1-2

Effect of reaction temperature on the number of methylol groups per structural unit of lignin at weight ratio of lignin:aldehyde = 5:1.

| Exp. | Temp ° C. | Reaction time (h) | pH | Increase $CH_2OH$/Structural unit of lignin. | Average of 3 exp | Increase Number of $CH_2OH$ |
|---|---|---|---|---|---|---|
| T-1 to T-3 | 50-60 | 3.0 | 9-10 | 0.32-0.67 | 0.51 | 1.0 |
| T-4 to T-6 | 60-65 | 3.0 | 9-10 | 2.33-2.57 | 2.48 | 3.0 |
| T-7 to T-9 | 65-70 | 3.0 | 9-10 | 2.89-3.4 | 2.93 | 3.0 |
| T-10 to T-12 | 70-75 | 3.0 | 9-10 | 2.44-2.94 | 2.54 | 3.0 |
| T-13 to T-15 | 75-80* | 3.0 | 9-10 | 1.74-2.14 | 1.87 | 2.0 |

*Temperatures above 80° C. gave crosslinked products even for lower reaction time.

TABLE 1-3

Effect of pH on the methylol groups per structural unit of lignin at weight ratio of lignin:aldehyde = 5:1 and reaction temperature = 65-70° C.

| Exp. | Reaction time (h) | pH | Increase $CH_2OH$/Structural unit of lignin. | Average of 3 exp | Increase number of $CH_2OH$ |
|---|---|---|---|---|---|
| Al-1 to Al-3 | 3.0 | 8-9 | 0.22-0.48 | 0.45 | — |
| Al-4 to Al-6 | 3.0 | 9-10 | 2.89-3.4 | 2.93 | 3.0 |
| Al-7 to Al-9 | 3.0 | 10-11 | 2.78-3.32 | 2.90 | 3.0 |
| Al-10 to Al-12 | 3.0 | 11-12 | 2.01-2.64 | 2.54 | 3.0 |
| Al-13 to Al-15* | 3.0 | 12-13 | 1.64-1.98 | 1.87 | 2.0 |

*pH 13 and above gave gel crosslinked products even for lower reaction time.

TABLE 1-4

Effect of reaction time on the number of methylol groups per structural unit of lignin at weight ratio of lignin:aldehyde = 5:1, pH = 9-10, and reaction temperature = 65-70° C.

| Exp. | Reaction time (h) | Increase $CH_2OH$/Structural unit of lignin | Average of 3 exp | Increase number of $CH_2OH$ |
|---|---|---|---|---|
| t-1 to t-3 | 2.5 | 1.80-2.48 | 2.03 | 2 |
| t-4 to t-6 | 3.0 | 2.89-3.4 | 2.93 | 3.0 |
| t-7 to t-9 | 3.5 | 2.92-3.12 | 2.97 | 3.0 |
| t-10 to t-12 | 4.0 | 2.85-3.10 | 2.90 | 3.0 |
| t-13 to t-15 | 5.0 | 2.65-2.86 | 2.79 | 3.0 |

*Reaction time above 5 hours gave crosslinked gel products.

Example 2

Purification and Stabilization of Lignin Methylol

The lignin methylol reaction products from Example 1 in each case were cooled to 0-5° C. and neutralized to pH 7 by adding a pre-cooled 10% phosphoric acid (at 5° C.). The viscous semi-solid lignin methylol products were separated from the aqueous solution, dissolved in ethanol, dried with molecular sieves, and either used directly after evaporating ethanol under reduced pressure or stabilized by alcohols for storage in a refrigerator for future use.

Example 3

Preparation and Separation of Methylol Lignin from Solid Lignin Waste

Solid lignin (500 grams) from pulping waste was dissolved in 10-20% sodium hydroxide solution, the pH was adjusted to 9-10, with 50% to 60% solid content, and the solution was treated with formaldehyde at lignin:formaldehyde net ratios of 20:1, 10:1, 5:1, 3.6:1, and 2.5:1. A reaction time of 3 hours with a pH of 10, a temperature of 60-75° C., and a lignin: formaldehyde net active content ratio of 5:1 gave 2.8 methylol groups per lignin structural unit. (Typical values are shown in Tables 1-1 to 1-4).

Example 4

Preparation of Methylol Lignosulphonate Derivatives

Lignosulphonate pulping by product was adjusted to a pH of 10 with 50% to 60% solid content and was treated with varying amounts of a formaldehyde solution to achieve lignin:formaldehyde net ratios of 20:1, 10:1, 5:1, 3.6:1, and 2.5:1.

Example 5

Preparation of Sodium Lignocarboxylate

One mole of a methylol lignin solution as prepared in Examples 1 or 2 was treated with citric acid at 30° C. using equivalent moles to methylol groups with mixing for two hours. The reaction mixture was then refluxed for one hour, cooled, and neutralized with a 20% sodium hydroxide solution to obtain sodium lignocarboxylate.

Example 6

Preparation of Sodium Lignocarboxylatesulphonate

One mole of methylol ligno sulphonate as prepared in Example 4 was treated with citric acid at 30° C. using equivalent moles to methylol groups with mixing for two hours. The reaction mixture was then refluxed for one hour, cooled, and neutralised with 20% sodium hydroxide solution to obtain sodium lignocarboxylatesulphonate dual functionality surfactant.

Example 7

Preparation of Sodium Lignogluconate

One mole of a methylol lignin solution as prepared in Examples 1, or 2 was treated with sodium gluconate or gluconic acid at 30° C. using equivalent moles to methylol groups. When sodium gluconate was used as reactant, 10% gluconic acid as catalyst and co reactant was added to the reaction mixture. The reaction mixture was mixed for two hours, and was then refluxed for one hour, cooled, and neutralized with 20% sodium hydroxide solution to obtain sodium lignogluconate surfactant.

Example 8

Preparation of Sodium Lignosulphonate Gluconate

One mole of a methylol lignosulphonate solution as prepared in Example 4 was treated with sodium gluconate or gluconic acid at 30° C. using equivalent moles to methylol groups. When sodium gluconate was used as reactant, 10% gluconic acid as catalyst and co reactant was added to the reaction mixture. The reaction mixture was mixed for two hours, and was then refluxed for one hour, cooled, and neutralized with 20% sodium hydroxide solution to obtain sodium lignosulphonate gluconate as lignin-based surfactant.

Example 9

Preparation of Lignocarboxylate from Black Liquor and Carbon Dioxide

An autoclave reactor was charged with black liquor and solid carbon dioxide (dry ice), and was then secured and heated to 125° C. at 100 atm pressure with mixing for five hours. The reaction mixture was cooled and then the degree of carboxylation was determined by FTIR spectroscopy carried out on a purified sample. The quantitative analyses were based on the peak height at 1750 $cm^{-1}$ related to carboxyl group. The product underwent carboxylation as demonstrated by a 2-5% increase in the solid content after the carboxylation reactions which was in a good agreement with the FTIR results.

Example 10

Reaction of Lignomethylol with Carbohydrates

Equimolar amounts of semi-viscous lignomethylol from Example 1 and each of the following carbohydrate sources (dextrose syrup, glucose syrup and sucrose syrup from dates, sorbitol and maltose) were mixed together in the presence of phosphoric acid as catalyst and heated in a 1500 W microwave oven for 30 minutes. A homogenous viscous product was obtained, which was partially soluble in water according to the source of lignomethylols and the number of methylol groups per lignin molecule. The soluble part was separated and its surfactant properties were determined including: dynamic and static surface tension, viscosity and cloud point. High molecular weight methylol lignin gave almost insoluble products (95%) and had excellent emulsifying and wetting properties.

Example 11

Reaction of Lignomethylol and Lignosulphonate Methylol with Amino Acids

Equimolar amounts of lignomethylol and lignosulphonate methylol derivatives from Example 1 were reacted with sodium salts of arginine, leucine, lysine, glycine, glutamic acid, aspartic acid and contrition sulphate using equivalent moles of amino acid sodium salt to methylol groups in the presence of triethylamine as solvent. The reaction mixture was heated on a water bath at 60° C. for three hours. The lignoaminoacid salt surfactants obtained were separated, purified, and the general efficiency of the surfactants were determined including: surface tension measurement of water containing different concentrations of each surfactant, viscosity and cloud point.

Example 12

Preparation of Gemini Surfactants from Lignin-based Materials and Amino Acids

In the presence of triethylamine as solvent, lignomethylol and lignosulphonate methylol derivatives with two or more methylol groups per molecule from Example 1 were reacted with sodium salts of arginine, leucine, lysine, glycine, glutamic acid, aspartic acid and contrition sulphate in equimolar amounts based on moles of amino acid sodium salt to moles of methylol groups. The Gemini lignin-based surfactants obtained were separated, purified, and the general efficiency of the surfactants were determined including: surface tension measurement of water containing different concentrations of each surfactant, viscosity and cloud point. The surfactant efficiency of these surfactants was superior to that of those from Example 11.

Example 13

Preparation of Gemini Surfactants from Ligin-based Materials and Ethylene Diamines Lignomethylol and lignosulphonate methylol derivatives with two or more methylol groups per molecule from Example 1 were reacted with a series of ethylene diamines (ethylene diamine, diethylenetriamine, triethylenetetramine and tetraethylenepentamine) by mixing equimolar amounts of each component based on moles of amino acid sodium salt to moles of methylol groups and heating the mixture at 60-70 C for three hours. The Gemini lignin-based surfactants obtained were separated, purified, and the general efficiency of the surfactants were determined including: surface tension measurement of water containing different concentrations of each surfactant, viscosity and cloud point.

Example 14

Reaction of Lignomethylol with Epoxide-terminated Polyethylene Oxide

Lignomethylols from Example 1 and polyethylene oxide terminated with epoxide groups (Mn=200-600) were combined using equivalent molar ratios based on moles of polyethylene oxide to moles of methylol groups in the presence of phosphoric acid as catalyst and heated to 50-60° C. with continuous mixing for three hours. The lignin-based surfactants obtained were separated, purified, and the general efficiency of the surfactants were determined including: surface tension measurement of water containing different concentrations of each surfactant, viscosity and cloud point.

Example 14

Reaction of Lignomethylol with Silicon Oil

Lignomethylols from Example 1 and silicon oil terminated with active siloxane groups were combined using equivalent molar ratios based on moles of siloxane to moles of methylol groups with continuous mixing at room temperature under dry conditions overnight. The lignin-based surfactants obtained were separated, purified, and the general efficiency of the surfactants were determined including: surface tension measurement of water containing different concentrations of each surfactant, viscosity and cloud point.

Example 15

Reaction of Lignomethylol with Methylol Urea

Lignin methylol resin (200 g) from Example 1 was combined with 100 g methylol urea in a reaction vessel fitted with mechanical stirrer. The mixture was heated to 60° C. allowed to react for one hour, and was then cooled to solidify. The lignourea reaction product was ground and sieved to different sized particles. The product was evaluated as a controlled release fertilizer using leaching columns and standard static leaching tests.

Example 16

Reaction of Lignomethylol with Methylol of Linear Urea Formaldehyde

Lignin methylol resin (200 g) from Example 1 was combined with methylol of linear urea formaldehyde resin (100 g) in a reaction vessel fitted with mechanical stirrer. The mixture was heated to 60° C. allowed to react for one hour, and was then cooled to solidify. The lignourea reaction product was ground and sieved to different sized particles. The product was evaluated as a controlled release fertilizer using leaching columns and standard static leaching tests.

Example 17

Reaction of Lignomethylol with Methylol Biuret

Lignin methylol resin (200 g) from Example 1 was combined with methylol biuret (100 g) in a reaction vessel fitted with mechanical stirrer. The mixture was heated to 60° C. allowed to react for one hour, and was then cooled to solidify. The lignobiuret reaction product was ground and sieved to different sized particles. The product was evaluated as a controlled release fertilizer using leaching columns and standard static leaching tests.

Example 18

Reaction of Lignomethylol with Methylol Polyurea Formaldehyde and Crosslinking Agent Lignin methylol resin (200 g) from Example 1 was combined with methylol polyurea formaldehyde (100 g) in the presence of 0.05, 0.1, 0.2, and 0.3 weight percent of methylolamine co-reactant from dihydroxy urea in a reaction vessel fitted with mechanical stirrer. The mixture was heated to 60° C. and allowed to react for one hour, and was then cooled to solidify. The lignopolyureaformaldehyde reaction product was ground and sieved to different sized particles. The product was evaluated as a hydrogel controlled release fertilizer using leaching columns and standard static leaching tests. The hydrogel properties were evaluated from the weight percent water absorbed as function of time, temperature, and pH.

Example 19

Reaction of Lignomethylol with Chondroitin Sulphate

Lignin methylol resin (200 g) from Example 1 was combined with chondroitin sulphate (100 g) in a reaction vessel fitted with mechanical stirrer. The mixture was heated to 60° C. allowed to react for one hour, and was then cooled to solidify. The lignochondroitinsulphate hydrogel reaction product was ground and sieved to different sized particles. The product was evaluated as a hydrogel controlled release fertilizer using leaching columns and standard static leaching tests. The hydrogel properties were evaluated from the weight percent water absorbed as function of time, temperature, and pH.

Example 20

Reaction of Lignomethylol with Methylol Polyacrylamide and Dimethylol Urea

Lignin methylol resin (200 g) from Example 1 was combined with methylol polyacrylamide (100 g) in the presence of 0.05, 0.1, 0.2, and 0.3 weight percent of dimethylol urea in a reaction vessel fitted with mechanical stirrer. The mixture was heated to 60° C. allowed to react for one hour, and was then cooled to solidify. The lignopolyureapolyacrylate hydrogel reaction product was ground and sieved to different sized particles. The product was evaluated as a hydrogel controlled release fertilizer using leaching columns and standard static leaching tests. The hydrogel properties were evaluated from the weight percent water absorbed as function of time, temperature, and pH.

Example 21

Reaction of Lignomethylol with Methylol Urea and Isocyanate Terminated Polyurethane Lignin methylol resin (200 g) from Example 1 was combined with methylol urea (100 g) and 0.05, 0.1, 0.15, and 0.2 weight percent of polyurethane terminated with active isocyanate as hydrogel and crosslinking agent. Reaction takes place instantly to get ligno-based hydrogel controlled released fertilizer. The product was ground and sieved to different sized particles. The product was evaluated as a hydrogel controlled release fertilizer using leaching columns and standard static leaching tests. The hydrogel properties were evaluated from the weight percent water absorbed as function of time, temperature, and pH.

Example 25

Reaction of Lignomethylol with Lignosulphonate Carboxylate Surfactant and Methylol Urea Lignin methylol resin (200 g) from Example 1 was suspended in 10 liters of water and combined with 2 to 5 weight percent of lignosulphonate carboxylate surfactant and methylol urea (100 g). The mixture was mixed well for five minutes to get a homogenous emulsion. The lignomethylol emulsion was sprayed over dusted soil and evaluated as a soil stabilizer using the tunnel erosion method, after thermal curing. The product was also evaluated as a hydrogel controlled release fertilizer using leaching columns and standard static leaching tests. The hydrogel properties were evaluated from the weight percent water absorbed as function of time, temperature, and pH.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or figure, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed is:

1. A method of preparing a controlled release fertilizer, the method comprising contacting a crosslinking agent selected from an isocyanate terminated polyol; a polyhydroxy carboxylic acid; a polyamino acid; chondroitin; chondroitin sulphate; or a combination thereof, a lignin-based material and at least one reagent comprising a methylol of a nitrogen-based compound to produce a mixture comprising the controlled release fertilizer, wherein the lignin-based material has about 1 to about 4 methylol groups per lignin unit.

2. The method of claim 1, wherein contacting the lignin-based material comprises contacting lignin methylol or lignosulphonate methylol, or a combination thereof.

3. The method of claim 1, wherein contacting the at least one reagent comprising the methylol of a nitrogen-based compound comprises contacting at least one reagent chosen from a methylol urea; a methylol of linear urea formaldehyde; a methylol biuret; a methylol of polyurea; a methylol of polyurea formaldehyde in the presence of a methylolamine co-reactant from dihydroxy urea; a methylol of polyurea in the presence of a methylolamine co-reactant from dihydroxy urea; a methylol of a polyaminoacid salt; a methylol of chondroitin sulphate; a methylol of chondroitin; a methylol of an amino acid salt; a methylol of a polyaminoacid; a di-methylol polyurea; a tri-methylol polyurea; a tetra-methylol polyurea; an oligo-methylol polyurea; a di-methylol polyureaformaldehyde; a tri-methylol polyureaformaldehyde; a tetra-methylol polyureaformaldehyde; an oligo-methylol polyureaformaldehyde; a di-methylol urea; a tri-methylol urea; a tetra-methylol urea; an oligo-methylol urea; a di-methylol polyacrylamide; a tri-methylol polyacrylamide; a tetra-methylol polyacrylamide; an oligo-methylol polyacrylamide; a di-methylol of a polyaminoacid salt condensate; a tri-methylol of a polyaminoacid salt condensate; a tetra-methylol of a polyaminoacid salt condensate; an oligo-methylol of a polyaminoacid salt condensate; a di-methylol of an amino acid; tri-methylol of an amino acid; a tetra-methylol of an amino acid; an oligo-methylol of an amino acid; a di-methylol of chondroitin sulphate; a tri-methylol of chondroitin sulphate; a tetra-methylol of chondroitin sulphate; an oligo-methylol of chondroitin sulphate; a di-methylol of chondroitin; a tri-methylol of chondroitin; a tetra-methylol of chondroitin; an oligo-methylol of chondroitin; a di-methylol biuret; a tri-methylol biuret; a tetra-methylol biuret; an oligo-methylol biuret; dimethylol acrylamide; or a combination thereof.

4. The method of claim 1, wherein contacting the lignin-based material and the at least one reagent is in a molar ratio of about 1:1 to about 1:1.2 based on the number of methylol groups in the lignin-based material and the number of methylol groups in the at least one reagent.

5. The method of claim 1, wherein contacting the lignin-based material and to the at least one reagent is in a molar ratio of about 1:1 based on the number of methylol groups in the lignin-based material and the number of methylol groups in the at least one reagent.

6. The method of claim 1, further comprising:
cooling the mixture comprising the controlled release fertilizer;
filtering the cooled mixture;
drying the filtered mixture to produce a solid; and
grinding the solidified mixture.

7. The method of claim 6, further comprising sieving the ground solidified mixture.

8. The method of claim 1, further comprising preparing the methylol of a nitrogen-based compound by methylolating at least one precursor compound comprising urea, biuret, a polyurea, a polyurea formaldehyde, an acrylamide, a polyacrylamide, chondroitin, chondroitin sulfate, an amino acid, an amino acid salt, or any combination thereof.

9. The method of claim 8, comprising:
contacting the at least one precursor compound with formaldehyde at a ratio of about 1:2.5, at a pH of about 9 to about 10, and at a temperature of about 60° C. to about 65° C., for about 2 to about 3 hours to produce a mixture comprising the methylol of a nitrogen-based compound.

10. The method of claim 9, further comprising:
cooling mixture comprising the methylol of a nitrogen-based compound to a temperature of about 0° C. to about 5° C.;
neutralizing the cooled mixture with pre-cooled phosphoric acid, amino carboxylic acid, hydroxyl carboxylic acid, which is at a temperature of about 0° C. to about 10° C.; and
drying the neutralized mixture under reduced pressure to produce the methylol of a nitrogen-based compound.

11. The method of claim 1, further comprising adding an amount of a surfactant to the mixture comprising the controlled release fertilizer.

12. The method of claim 11, wherein adding the surfactant comprises adding a lignin-based surfactant.

13. The method of claim 12, wherein adding the lignin-based surfactant comprises adding a lignocarboxylate, a lignosulphonate carboxylate, a lignoethanolamine, a lignosulphonate ethanolamine, a lignoglucoside, a lignosulphonate glucoside, a lignoamino acid, or a lignosulphonate amino acid.

14. The method of claim 11, wherein adding the surfactant is in an amount of about 2 to about 5 weight percent.

15. A method of preparing a hydrogel controlled release fertilizer, the method comprising contacting a crosslinking agent selected from an isocyanate terminated polyol; a polyhydroxy carboxylic acid; a polyamino acid; chondroitin; chondroitin sulphate; or a combination thereof, a lignin-based material and at least one reagent to produce a mixture comprising the hydrogel controlled release fertilizer, wherein the at least one reagent comprises a methylol of a nitrogen-based compound, a hydrogel forming material, or a combination thereof, wherein the lignin-based material has about 1 to about 4 methylol groups per lignin unit.

16. The method of claim 15, wherein contacting the lignin-based material comprises contacting lignin methylol or ligno-sulphonate methylol, or a combination thereof.

17. The method of claim 15, wherein contacting the at least one reagent comprising the methylol of a nitrogen-based compound comprises contacting at least one reagent chosen from a methylol urea; a methylol of linear urea formaldehyde; a methylol biuret; a methylol of polyurea; a methylol of polyurea formaldehyde in the presence of a methylolamine co-reactant from dihydroxy urea; a methylol of polyurea in the presence of a methylolamine co-reactant from dihydroxy urea; a methylol of a polyaminoacid salt; a methylol of chondroitin sulphate; a methylol of chondroitin; a methylol of an amino acid salt; a methylol of a polyaminoacid; a di-methylol polyurea; a tri-methylol polyurea; a tetra-methylol polyurea; an oligo-methylol polyurea; a di-methylol polyureaformaldehyde; a tri-methylol polyureaformaldehyde; a tetra-methylol polyureaformaldehyde; an oligo-methylol polyureaformaldehyde; a di-methylol urea; a tri-methylol urea; a tetra-methylol urea; an oligo-methylol urea; a di-methylol polyacrylamide; a tri-methylol polyacrylamide; a tetra-methylol polyacrylamide; an oligo-methylol polyacrylamide; a di-methylol of a polyaminoacid salt condensate; a tri-methylol of a polyaminoacid salt condensate; a tetra-methylol of a polyaminoacid salt condensate; an oligo-methylol of a polyaminoacid salt condensate; a di-methylol of an amino acid; tri-methylol of an amino acid; a tetra-methylol of an amino acid; an oligo-methylol of an amino acid; a di-methylol of chondroitin sulphate; a tri-methylol of chondroitin sulphate; a tetra-methylol of chondroitin sulphate; an oligo-methylol of chondroitin sulphate; a di-methylol of chondroitin; a tri-methylol of chondroitin; a tetra-methylol of chondroitin; an oligo-methylol of chondroitin; a di-methylol biuret; a tri-methylol biuret; a tetra-methylol biuret; an oligo-methylol biuret; dimethylol acrylamide; or a combination thereof.

18. The method of claim 15, wherein the hydrogel forming material is selected from methylolpolyacrylamide; polyaminoacids; methylolpolyaminoacids; chondroitin;
chondroitin sulphate; methylol chondroitin; methylolchondroitin sulphate; polyhydroxy carboxylic acids; and combinations thereof.

19. The method of claim 15, further comprising adding an amount of a surfactant to the mixture comprising the hydrogel controlled release fertilizer.

20. The method of claim 19, wherein the surfactant is a lignin-based surfactant.

21. The method of claim 20, wherein the lignin-based surfactant is a lignoamino acid salt compound, a lignosulphonate amino acid salt compound, a lignosilicone compound, a lignosulphonate silicone compound, a lingo-functionalized polymer compound, a lignosulphonate-functionalized polymer compound, a lignosaccharide compound, a lignosulphonate saccharide compound, a lignoethylendiamine derivative compound, a lignosulphonate ethylendiamine derivative compound, a lignoethanolamine derivative compound, a lignosulphonate ethanolamine derivative compounds, a lignoglycoside, a lignosulphonate glycoside, or a combination thereof.

* * * * *

UNITED STATES PATENT AND TRADEMARK OFFICE
CERTIFICATE OF CORRECTION

PATENT NO.         : 9,039,803 B2
APPLICATION NO.    : 13/699193
DATED              : May 26, 2015
INVENTOR(S)        : Adam Page 1 of 1

It is certified that error appears in the above-identified patent and that said Letters Patent is hereby corrected as shown below:

On the Title Page, in Item (87), under "PCT Pub. No.", in Column 1, Line 1, delete "WO2013/133919" and insert -- WO2013/133819 --, therefor.

IN THE SPECIFICATION

In Column 18, Line 47, delete "polyureas" and insert -- polyurea; --, therefor.

Signed and Sealed this
Seventeenth Day of November, 2015

Michelle K. Lee
*Director of the United States Patent and Trademark Office*